United States Patent
Lind (10) Patent No.: US 10,224,806 B1
(45) Date of Patent: Mar. 5, 2019

(54) POWER CONVERTER WITH SELECTIVE TRANSFORMER WINDING INPUT

(71) Applicant: Infineon Technologies Austria AG, Villach (AT)

(72) Inventor: Anders Lind, San Jose, CA (US)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 15/815,272

(22) Filed: Nov. 16, 2017

(51) Int. Cl.
H02M 1/08 (2006.01)
H02M 1/14 (2006.01)
H02M 3/335 (2006.01)

(52) U.S. Cl.
CPC ............. H02M 1/143 (2013.01); H02M 1/08 (2013.01); H02M 3/33523 (2013.01)

(58) Field of Classification Search
CPC ..... H02M 1/143; H02M 1/08; H02M 3/33523
See application file for complete search history.

(56) References Cited

U.S. PATENT DOCUMENTS

| | | | |
|---|---|---|---|
| 5,640,310 | A | 6/1997 | Yasumura |
| 5,867,374 | A | 2/1999 | Moreau |
| 7,911,808 | B2 | 3/2011 | Huynh et al. |
| 2003/0043600 | A1 | 3/2003 | Morita |
| 2004/0156217 | A1 | 8/2004 | Phadke |
| 2005/0030772 | A1 | 2/2005 | Phadke |
| 2005/0226008 | A1 | 10/2005 | Harada et al. |
| 2008/0309303 | A1 | 12/2008 | Morota et al. |
| 2011/0032731 | A1 | 2/2011 | Coleman et al. |
| 2011/0222319 | A1 | 9/2011 | Marumo et al. |
| 2013/0235623 | A1 | 9/2013 | Huang |
| 2016/0322967 | A1 | 11/2016 | Inakagata et al. |

FOREIGN PATENT DOCUMENTS

| | | |
|---|---|---|
| CN | 201226496 Y | 4/2009 |
| CN | 105375800 A | 3/2016 |
| EP | 2058933 A2 | 5/2009 |
| JP | 2002034255 A | 1/2002 |
| WO | 0008742 A1 | 2/2000 |

OTHER PUBLICATIONS

Bai, Yongjiang et al., "A novel Constant Voltage Primary-side Regulation Topology to Eliminate Auxiliary Winding", 2016 IEEE Energy Conversion Congress and Exposition (ECCE), Sep. 2016, pp. 1-6.

*Primary Examiner* — Emily P Pham

(74) *Attorney, Agent, or Firm* — Murphy, Bilak & Homiller, PLLC (57) ABSTRACT

Circuits and methods are provided for supplying power to a transformer of a switching DC/DC voltage converter within a power converter. The power converter includes separate nodes that can potentially supply such power. A first of these nodes is coupled, typically directly and with no energy-storing bulk capacitor, to a rectifier that supplies rectified power from an alternating current power source. A second node is also supplied power from the rectifier, but is coupled to a bulk capacitor that can store and supply energy as needed. The techniques disclosed herein use the first node to supply power to the transformer when feasible, and use the second node, and its associated bulk capacitor, to supply power otherwise. In so doing, the energy storage requirements of the bulk capacitor may be reduced, meaning that the capacitance and associated size of the bulk capacitor may be reduced relative to other power converter circuits.

17 Claims, 8 Drawing Sheets

POWER CONVERTER WITH SELECTIVE TRANSFORMER WINDING INPUT

TECHNICAL FIELD

The present application relates to power converters and, in particular, relates to circuits comprising a first rectified voltage node having no bulk capacitor and a second rectified voltage node coupled to a bulk capacitor, and to techniques for selecting a transformer input from either or both of the first and second rectified voltage nodes.

BACKGROUND

Line power converters input alternating current (AC) power and convert it into direct current (DC) power for supplying a load, e.g., charging batteries in smart phones, laptops, or other portable devices, or for otherwise powering an electronic device. Such power converters typically include an input stage, which converts an input AC voltage into an intermediate voltage that is DC, and a switching DC/DC converter, which converts the intermediate DC voltage into an output DC voltage level that is appropriate for powering the load.

Power converters limited to low or moderate power requirements, e.g., below an input power of 75 W, typically require no power factor correction. The input stage for such power converters typically includes a protection circuit, an electromagnetic interference (EMI) filter, a bridge rectifier, and a bulk capacitor. The EMI filter and the protection circuit are connected to an input power source, such as an AC line voltage provided by an electrical mains. The output of the protection circuit and the EMI filter is provided to a rectifier, such as a diode-based bridge rectifier, that outputs a rectified voltage. The rectified voltage is coupled to the bulk capacitor, which filters the rectified (DC) voltage. More particularly, this filtered voltage may be characterized as having an average (DC) value with a ripple superimposed on it, wherein the ripple frequency is related to a frequency of the AC power source (e.g., 50 Hz, 60 Hz) and the ripple magnitude is largely determined by the value of the bulk capacitor.

The DC intermediate voltage is input to the switching DC/DC voltage converter. The DC/DC voltage converter includes a transformer comprised of primary and secondary windings. One or more power switches switchably couple the intermediate DC voltage onto the primary winding(s) of the DC/DC voltage converter, thereby producing an AC voltage across the primary winding(s). This induces an AC voltage on the secondary winding(s) of the DC/DC voltage converter. The secondary-side voltage and current are rectified and filtered before being provided to the power converter load. The DC/DC voltage converter operates optimally when its input intermediate DC voltage is constant. In practice, the bulk capacitance is chosen so as to constrain the ripple of the intermediate DC voltage to be within an acceptably narrow range. The DC/DC voltage converter may specify an acceptable voltage range for this input, or may specify a minimum allowed input voltage.

Power converters configured to work with various AC mains voltage levels, i.e., universal input converters, require a bulk capacitor capable of handling fairly large voltages. For example, a capacitor voltage rating of 400V may be necessary to handle line voltages of 340V peak ($240\ V_{RMS}$), as used in much of the world, together with some margin for lightning surges, etc. The bulk capacitor must also have a fairly large capacitance so as to meet the input voltage requirements (voltage ripple and/or minimum voltage) of the DC/DC voltage converter. For example, a capacitance of 1.5 to 2.0 µF per Watt of power rating for the power converter may be required.

The physical size (volume and printed circuit board footprint) of the bulk capacitor within a typical power converter is quite large due to its required capacitance and maximum voltage ratings. The size requirements for DC/DC voltage converters are on a gradual downward trajectory, as their constituent components, e.g., transformer, capacitors, inductors, may be reduced in size as the switching frequency of DC/DC voltage converters increases. However, such scaling does not apply to the bulk capacitor, as the input voltage frequency is fixed to that provided by the power source, e.g., the mains voltage. The bulk capacitor already consumes a large portion of the overall volume for a power converter, and this portion is increasing due to the gradually decreasing size requirements for the DC/DC voltage converter.

One technique for reducing the capacitance of the bulk capacitor is to include a non-isolated boost converter that pre-regulates the input voltage to a much higher voltage (e.g., 400V) that is fed to the DC/DC voltage converter. This is the approach taken by power factor correction (PFC) converters. Because a much higher voltage is provided to the DC/DC voltage converter, a smaller bulk capacitor may be used while still meeting minimum voltage input requirements of the DC/DC voltage converter. However, such an approach has drawbacks in terms of efficiency, as the added conversion stage has associated power loss. Furthermore, the boost converter employs a fairly large input inductor, which largely negates any size reduction of the bulk capacitor. Hence, the complexity and size of an added input stage, e.g., a boost or other PFC converter, makes such approaches undesirable, at least for lower-power converters that do not require PFC.

Circuits and associated techniques are desired that would allow for a reduction in the bulk capacitor used within power converters.

SUMMARY

According to an embodiment of a power converter, the power converter is configured to input alternating current (AC) power from an input source and supply direct current (DC) power. The power converter includes a rectifier, a bulk capacitor, a transformer, a first power switch, a second power switch, and a controller. The rectifier is configured to input the AC power and provide a rectified voltage at a rectified voltage node. The bulk capacitor is supplied power from the AC input source, e.g., via the rectified voltage node. The transformer includes one or more primary-side windings. The first switch is configured to provide power to the primary-side windings from the rectified voltage node, whereas the second switch is configured to provide power to the primary-side windings from the bulk capacitor. The controller manages the switching of the first and second switches based upon its sensing of a rectified voltage at the rectified voltage node and a minimum voltage to be input to the primary-side windings. When the controller detects that the sensed rectified voltage is above the minimum voltage, the controller switches the first switch such that the first switch provides power to the primary-side windings from the rectified voltage node. When the controller detects that the sensed rectified voltage is below the minimum voltage, the controller switches the second switch such that the second switch provides power to the primary-side windings from the bulk capacitor.

According to an embodiment of a method for controlling a power converter, the method provides techniques for converting AC power from an input source into DC power. The power converter comprises a rectifier configured to provide a rectified voltage at a rectified voltage node, a bulk capacitor that is supplied power from the input source (e.g., via the rectified voltage node), a transformer comprising one or more primary-side windings, a first switch configured to provide power to the primary-side windings from the rectified voltage node, and a second switch configured to provide power to the primary-side windings from the bulk capacitor. The method includes techniques for switching the first and second switches based upon a sensed rectified voltage at the rectified voltage node, and a minimum voltage to be input to the primary-side windings. When the sensed rectified voltage is above the minimum voltage, the first switch is switched such that the first switch provides power to the primary-side windings from the rectified voltage node. When the sensed rectified voltage is below the minimum voltage, the second switch is switched such that the second switch provides power to the primary-side windings from the bulk capacitor.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments may be combined unless they exclude each other. Embodiments are depicted in the drawings and are detailed in the description that follows.

DETAILED DESCRIPTION

The embodiments described herein provide circuits and methods that enable a reduction in size for a bulk capacitor within a power converter that is comprised of an input stage and a switching DC/DC voltage converter. This size reduction is realized by decreasing the required capacitance of the bulk capacitor, while still meeting input voltage requirements for the switching DC/DC voltage converter. Described below are several circuit topologies that enable such a capacitance reduction. Unlike conventional power converters that couple a rectifier output to a bulk capacitor and to a power stage input of a switching DC/DC voltage converter, the circuits described herein include both a first rectified voltage node, which cannot be powered from the bulk capacitor, and a second rectified voltage node, which is coupled to and can be powered from the bulk capacitor. A voltage of the first rectified voltage node is measured and used to determine whether power from the first rectified voltage node or the second rectified voltage node should be provided to the transformer of the switching DC/DC voltage converter.

The switching DC/DC voltage converter includes a transformer having primary and secondary-side windings. A first power switch is configured to switchably couple the first rectified voltage node to a first primary-side winding. A second power switch is configured to switchably couple the second rectified voltage node to the first primary-side winding, or another primary-side winding. A controller determines whether the first power switch, and its associated first rectified voltage node, or the second power switch, and its associated second rectified voltage node, should supply power to the primary-side winding(s). Such determination is based upon a voltage measured at the first rectified voltage node. In the preferred embodiments, the first power switch and the first rectified voltage node are selected to power the primary-side winding(s) whenever the measured voltage is above a minimum voltage threshold. Otherwise, the second power switch and the second rectified voltage node, which can draw energy from the bulk capacitor, are selected to supply power to the primary-side winding(s). Once this determination is made, the controller switches the selected power switch, e.g., using conventional techniques, in order to meet the power requirements for a load of the power converter.

The inventive techniques may be applied to a variety of power converters that rely upon switched DC/DC voltage conversion. For ease of explanation, the inventions are described by way of particular examples in the context of a flyback converter. One skilled in the art will recognize that the techniques are readily extrapolated to other power converter topologies, such as forward converters, and other variants, such as quasi-resonant (QR) converters and active clamp converters. The controller in the examples described below is located on the primary side of the controller, but the controller could be located on the secondary side. This would require modifications such as isolation circuits, as are known in the art.

It should be understood that the particular examples described below are not meant to be limiting. Circuits and techniques that are well-known in the art are not described in detail, so as to avoid obscuring the unique aspects of the invention. Features and aspects from the example embodiments may be combined or re-arranged, except where the context does not allow this.

Power Converter with Separate Voltage Nodes to Power Primary-Side Windings

Figure 1:
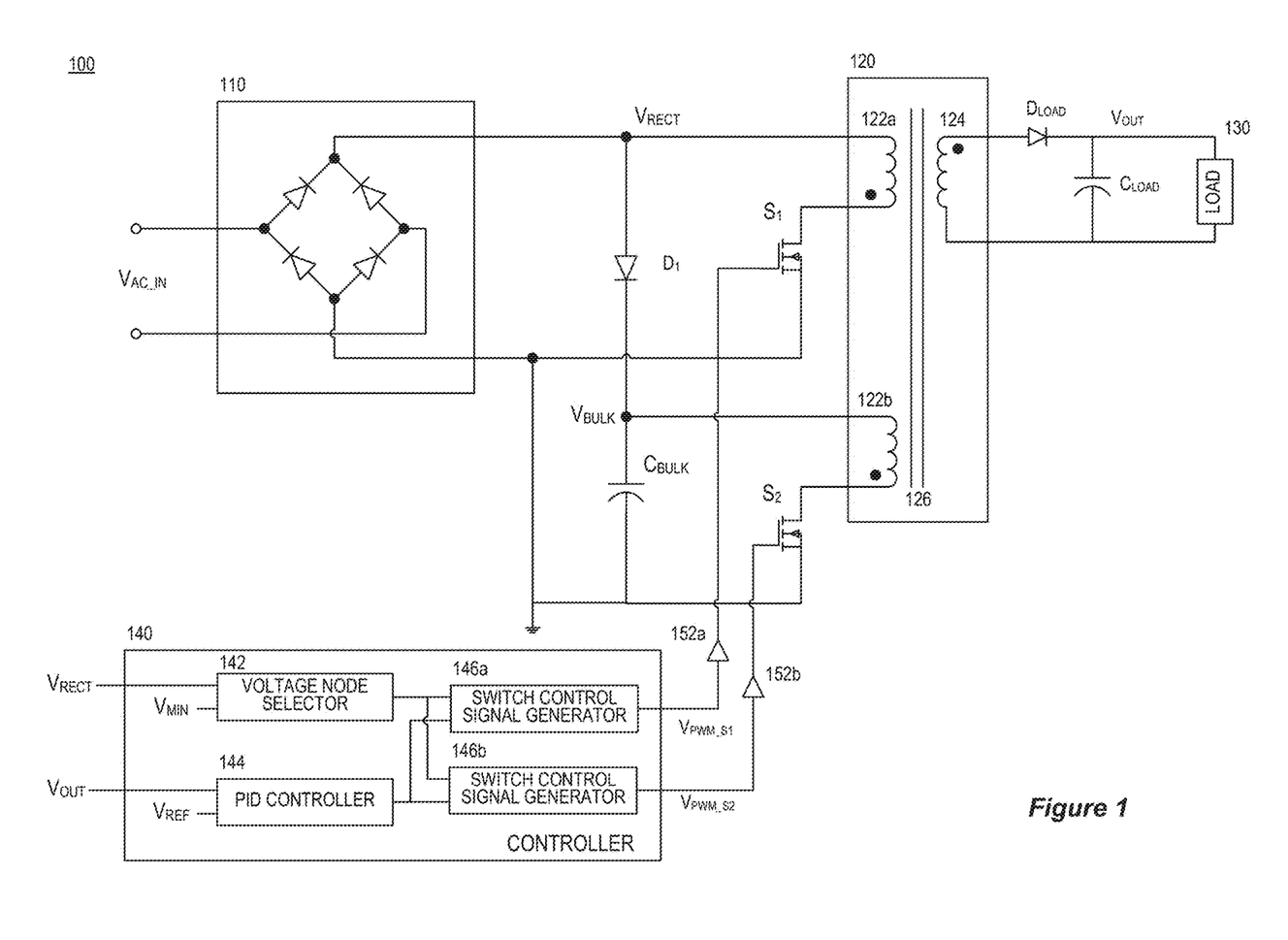
FIG. 1 illustrates a schematic diagram of a power converter having primary-side windings that are suppled power from two different voltage nodes.

FIG. 1 illustrates an embodiment of a forward power converter 100. This power converter 100 differs from conventional power converters in that it includes a first rectified voltage node, denoted $V_{RECT}$, and a second rectified voltage node, denoted $V_{BULK}$. The first rectified voltage node $V_{RECT}$ is coupled directly to a bridge rectifier 110, and is not coupled to an energy-storage component, such as a bulk capacitor, that is capable of supplying substantial energy to the first rectified voltage node. (A filter capacitor, having a relatively small capacitance and having a primary function of reducing high-frequency noise, is not considered a bulk capacitor in this context.) The second rectified voltage node $V_{BULK}$ is also supplied power from the bridge rectifier 110, but is coupled to a bulk capacitor $C_{BULK}$ which serves as an energy-storage component. A controller 140 determines which of the rectified voltage nodes $V_{RECT}$, $V_{BULK}$ should be coupled to the primary side of a transformer 120 when the DC/DC voltage converter is switched. By using the first rectified voltage node $V_{RECT}$ whenever it is capable of meeting minimum voltage requirements for the switching DC/DC voltage converter, the power converter 100 is less reliant on the second rectified voltage node $V_{BULK}$ and the energy stored in the bulk capacitor $C_{BULK}$. This, in turn, means that the capacitance and associated size of the bulk capacitor $C_{BULK}$ may be reduced relative to power converters that do not include or use a first rectified voltage node such as the node $V_{RECT}$ within FIG. 1. With these unique features of the power converter 100 summarized above, the power converter 100 of FIG. 1 will now be described in further detail.

The power converter 100 includes a bridge rectifier 110, a transformer 120, power switches $S_1$ and $S_2$, and a controller 140. The power converter 100 supplies power to a load 130 on the secondary side of the transformer 120.

The rectifier 110 inputs power from an AC power source, denoted $V_{AC\_IN}$, such as a mains supply. The illustrated rectifier 110 is arranged as a conventional diode bridge, though other arrangements are possible, such as active rectification based upon power switches rather than diodes. The rectifier 110 outputs a rectified voltage at a first rectified voltage node $V_{RECT}$. The first rectified voltage node $V_{RECT}$ is coupled to a diode $D_1$ which, in turn, is coupled to the bulk capacitor $C_{BULK}$ at a second rectified voltage node, denoted $V_{BULK}$. The diode $D_1$ allows current (power) to flow from the bridge rectifier 110 and the first rectified voltage node $V_{RECT}$ to the bulk capacitor $C_{BULK}$ and its voltage node $V_{BULK}$, but does not allow energy to be drained from the bulk capacitor $C_{BULK}$ back to the first rectified voltage node $V_{RECT}$. In this way, the diode $D_1$ charges the bulk capacitor $C_{BULK}$ whenever the voltage at the first rectified voltage node $V_{RECT}$ is sufficiently higher than the voltage at the voltage node $V_{BULK}$.

The transformer 120 includes a first primary-side winding 122a, a second primary-side winding 122b, a secondary-side winding 124, and a core 126. The first rectified voltage node $V_{RECT}$ is coupled to the first primary-side winding 122a, and the second rectified voltage node $V_{BULK}$ of the bulk capacitor $C_{BULK}$ is coupled to the second primary-side winding 122b. Current flow through the first primary-side winding 122a is controlled by a first power switch $S_1$, whereas current flow through the second primary-side winding 122b is controlled by the second power switch $S_2$. For this embodiment, the control, e.g., switching frequency, of each of the power switches $S_1$, $S_2$ may use conventional techniques, but novel techniques are used to select which of the power switches $S_1$, $S_2$ should be actively used and, related, which of the voltage nodes $V_{RECT}$, $V_{BULK}$ should provide power to the transformer 120. Such selection techniques are detailed in the description of the controller 140, which is found further below.

The power switches $S_1$, $S_2$ illustrated in FIG. 1 are enhancement-mode metal-oxide semiconductor field-effect transistors (MOSFETs), but other switch types may be used. For example, junction field-effect transistors (JFETs), bipolar junction transistors (BJTs), insulated gate bipolar transistors (IGBTs), high electron mobility transistors (HEMTs), or other types of power transistors may be preferred in some applications. The power switches $S_1$, $S_2$ may be integrated on the same semiconductor die, may each be provided on separate dies, or may otherwise be spread across a plurality of semiconductor dies. Drivers 152a, 152b provide control signals to the control terminals, e.g., MOSFET gates, of the power switches $S_1$, $S_2$.

Power flow through either of the primary-side windings 122a, 122b is coupled to the secondary-side winding 124 via the transformer core 126. A voltage induced across the secondary-side winding 124 is rectified by a diode $D_{LOAD}$ and filtered by a load capacitor $C_{LOAD}$. The resultant voltage $V_{OUT}$ is provided to the load 130 of the power converter 100.

The controller 140 is responsible for controlling the power converter 100 so as to supply the necessary power (voltage $V_{OUT}$ and current) to the load 130. This includes generating pulse-width-modulated (PWM) signals $V_{PWM\_S1}$, $V_{PWM\_S2}$ that control the power switches $S_1$, $S_2$ via the drivers 152a, 152b. Conventional control techniques are used to generate each of these PWM waveforms, based upon load requirements. For example, switch control signal generators 146a, 146b may generate PWM signals using a fixed switching frequency and a variable duty cycle. The duty cycle varies to adjust the power transfer across the transformer 120 to match the power needs of the load 130. This may be accomplished, e.g., using a proportional-integral-derivative (PID) controller 144. The PID controller 144 inputs a measured (sensed) voltage corresponding to the load voltage $V_{OUT}$, and varies the duty cycle(s) to maintain the load voltage $V_{OUT}$ as close as feasible to a desired reference voltage $V_{REF}$. The PID controller 144 provides the duty cycle(s) to the switch control signal generators 146a, 146b, which use the duty cycle(s) to generate the PWM signals $V_{PWM\_S1}$, $V_{PWM\_S2}$.

Other techniques may be used for controlling the power switches $S_1$, $S_2$. For example, PWM waveforms using a variable frequency and a fixed duty cycle may be used. Other power converter topologies, e.g., half-bridge, full-bridge, push-pull, may require additional power switches and associated control relative to the flyback power converter 100 illustrated within FIG. 1. While the controller 140 is illustrated as being on the primary side of the power converter 100, a similar power converter could locate a similar controller on the secondary side. Switch control techniques for other power converter topologies are well-known and will not be further explained herein, other than to note that the unique inventive techniques described within the voltage node selector 142 may be similarly applied to other power converter topologies.

The controller 140 also includes the voltage node selector 142, which is configured to read a measured (sensed) voltage corresponding to the node $V_{RECT}$. A minimum voltage, denoted $V_{MIN}$, that is required to adequately power the primary-side windings 122a, 122b is stored within a memory of the controller 140. The voltage node selector 142 monitors the measured voltage at the first rectified voltage node $V_{RECT}$ and compares it against the minimum voltage $V_{MIN}$. Whenever this measured voltage at $V_{RECT}$ is above the minimum voltage $V_{MIN}$, the voltage node selector 142 selects the first rectified voltage node $V_{RECT}$ for powering the transformer 120. When the voltage node selector 142 detects that the voltage at the first rectified voltage node $V_{RECT}$ has decreased to the minimum voltage $V_{MIN}$, the voltage node selector 142 instead selects the second rectified voltage node $V_{BULK}$, which is tied to the bulk capacitor $C_{BULK}$, for powering the transformer 120.

The voltage node selector 142 selects the first rectified voltage node $V_{RECT}$ by enabling the first switch control signal generator 146a. The first switch control generator 146a, in turn, generates a first PWM signal $V_{PWM\_S1}$ based upon an output of the PID controller 144, e.g., a duty cycle. The first PWM signal $V_{PWM\_S1}$ switches the first power switch $S_1$, via the first driver 152a, so as to generate an AC voltage across the first primary-side winding 122a. Power is effectively routed from the first rectified voltage node $V_{RECT}$ to the transformer 120. During this period, the second switch control signal generator 146b may be disabled, so that the second power switch $S_2$ is left open and no power is transferred from the voltage node $V_{BULK}$ of the bulk capacitor $C_{BULK}$.

Conversely, the voltage node selector 142 selects the second rectified voltage node $V_{BULK}$, which may draw energy from the storage provided by the bulk capacitor $C_{BULK}$, by enabling the second switch control signal generator 146b. The second switch control signal generator 146b generates a second PWM signal $V_{PWM\_S2}$ in the same manner as described above, except that the voltage node $V_{BULK}$ provides power to the second primary-side winding 122b of the transformer 120.

Regardless of which power switch $S_1$, $S_2$ is used and which voltage node $V_{RECT}$, $V_{BULK}$ supplies power to the primary side of the transformer 120, the power transferred to the secondary-side side winding 124 and the load 130 is similar.

The controller 140 and its constituent parts may be implemented using a combination of analog hardware components (such as transistors, amplifiers, diodes, and resistors), and processor circuitry that includes primarily digital components. The processor circuitry may include one or more of a digital signal processor (DSP), a general-purpose processor, and an application-specific integrated circuit (ASIC). The controller 140 may also include memory, e.g., non-volatile memory such as flash, that includes instructions or data for use by the processor circuitry, and one or more timers. Such memory may store values for the minimum voltage $V_{MIN}$ and the reference voltage $V_{REF}$. The controller 140 inputs sensor signals such as signals corresponding to the output voltage $V_{OUT}$ and the voltage at the first rectified voltage node $V_{RECT}$, and generates signals $V_{PWM\_S1}$, $V_{PWM\_S2}$ for controlling the switches $S_1$, $S_2$ within the power converter 100.

Figure 2A:
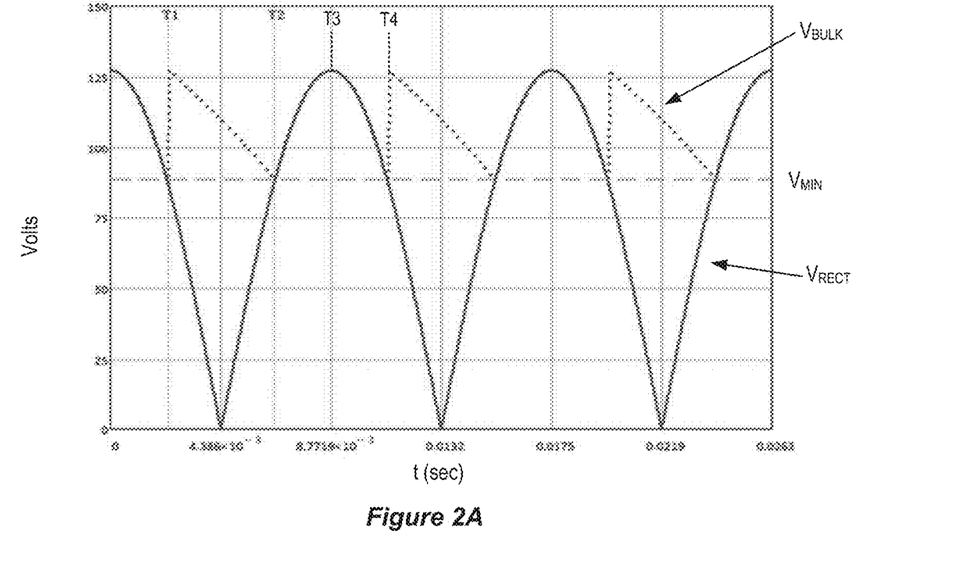
FIG. 2A illustrates voltage waveforms corresponding to two different nodes such as those included in the power converter of FIG. 1.

FIG. 2A illustrates waveforms corresponding to voltages within the power converter 100. An AC source voltage (not shown) supplies a sinusoidal voltage with a frequency of 57 Hz to the bridge rectifier 110, which outputs a rectified voltage, illustrated as $V_{RECT}$, having a peak amplitude of approximately 125 V. A minimum voltage, shown as $V_{MIN}$=86V, is required for proper operation of the power converter 100.

For the interval from time t=0 sec until time T1, the controller 140 selects the first rectified voltage node $V_{RECT}$ to power the first primary-side winding 122a. At time T1, the controller 140 detects that a measured voltage at the first rectified voltage node $V_{RECT}$ has decreased to the minimum voltage $V_{MIN}$. The controller 140 then selects the second rectified voltage node $V_{BULK}$, which is coupled to the bulk capacitor $C_{BULK}$, for powering the second primary-side winding 122b. Prior to this altered selection, the bulk capacitor $C_{BULK}$ was charged, via the diode $D_1$, to a voltage level of approximately 125V, i.e., the peak voltage at the first rectified voltage node $V_{RECT}$. At time T1, the voltage at the second rectified voltage node $V_{BULK}$ is switchably applied across the second primary-side winding 122b, and begins with an approximate value of $V_{BULK}$=125V. As energy is depleted from the bulk capacitor $C_{BULK}$ after time T1, the voltage $V_{BULK}$ decreases. For a properly-sized bulk capacitor $C_{BULK}$, the voltage $V_{BULK}$ should not drop below the minimum voltage $V_{MIN}$. At time T2, the controller 140 detects that the measured voltage at the first rectified voltage node $V_{RECT}$ has risen above the minimum voltage $V_{MIN}$, and again selects the first rectified voltage node $V_{RECT}$ to power the first primary-side winding 122a. This selection is maintained until time T4, when the bulk capacitor $C_{BULK}$ and its voltage node $V_{BULK}$ are next selected to power the second primary-side winding 122b. Between the times T2 and T3, the bulk capacitor $C_{BULK}$ is charged from the first rectified voltage node $V_{RECT}$ via the diode $D_1$.

In summary, the controller 140 selects the first rectified voltage node $V_{RECT}$ to power the transformer 120 between times t=0 and T1, when the voltage at $V_{RECT} > V_{MIN}$. Between times T1 and T2, when the voltage at $V_{RECT} < V_{MIN}$, the bulk capacitor $C_{BULK}$ and its voltage node $V_{BULK}$ are used to power the transformer 120. Note that the comparison with the minimum voltage $V_{MIN}$ may also make use of some hysteresis, e.g., the selection of the voltage node $V_{BULK}$ at time T2 may not occur until the rectified voltage reaches a value $V_{MIN} + V_{HYST}$.

If the power converter 100 is rated to output 25W to the load 130, and for a rectified input voltage peak of 125V, a bulk capacitance of approximately 26 μF is required to ensure that the voltage used to power the transformer 120 does not fall below the minimum voltage of 86V. Presuming a capacitor tolerance rating of 20%, a standard-sized bulk capacitor $C_{BULK}$=33μF would need to be used in such a power converter.

Figure 2B:
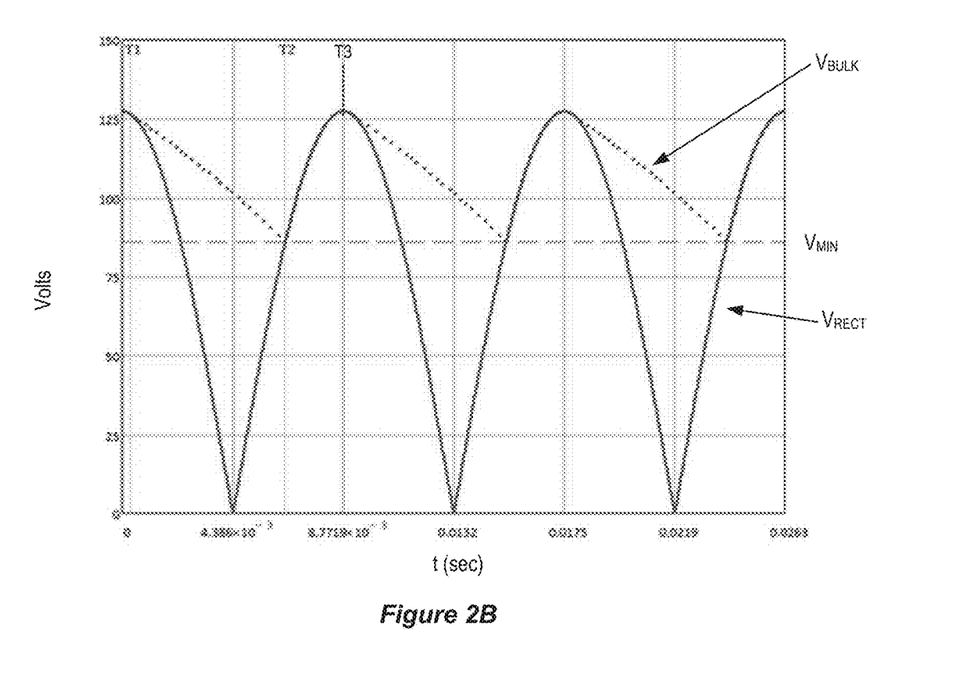
FIG. 2B illustrates voltage waveforms corresponding to nodes within a power converter in which power is supplied to primary-side windings only from a bulk capacitor.

FIG. 2B illustrates voltage waveforms within a power converter that does not select between separate rectified voltage nodes $V_{RECT}$, $V_{BULK}$ for powering a transformer, but instead always powers a transformer from a voltage node, such as $V_{BULK}$ of the power converter 100, that is tied to a bulk capacitor. For such a power converter, the bulk capacitor must power the transformer for the entire timespan from T1 to T2. (During the period between T2 and T3, a bridge rectifier provides power both to the transformer and to the bulk capacitor for charging.) Because the timespan for discharging the bulk capacitor is longer than the corresponding timespan illustrated in FIG. 2A, a larger bulk capacitor having higher energy-storage capabilities is required. More particularly, a rated bulk capacitor $C_{BULK}$=47μF would be needed to meet the same requirements described above in relation to FIG. 2A and power converter 100.

The waveforms of FIGS. 2A and 2B and the above description show that the power converter 100 is able to meet the same minimum voltage requirements for a DC/DC voltage converter with approximately a 33% reduction in the capacitance of the bulk capacitor. Whereas a conventional power converter rated for 25W output power may require a bulk capacitor $C_{BULK}$=47μF, the power converter 100 described above would only require a bulk capacitor of $C_{BULK}$=33μF. More generally, conventional power converters require 1.5 to 2.0μF of bulk capacitance for each rated Watt of output power. The circuits and techniques described herein allow the bulk capacitance to be reduced to less than 1.4 µF for each rated Watt of output power and, typically, the capacitance can be in the range of 1.0 to 1.4 µF for each rated Watt of output power.

Power Converter Controller Partitioned into Main and Companion Controllers

Figure 3:
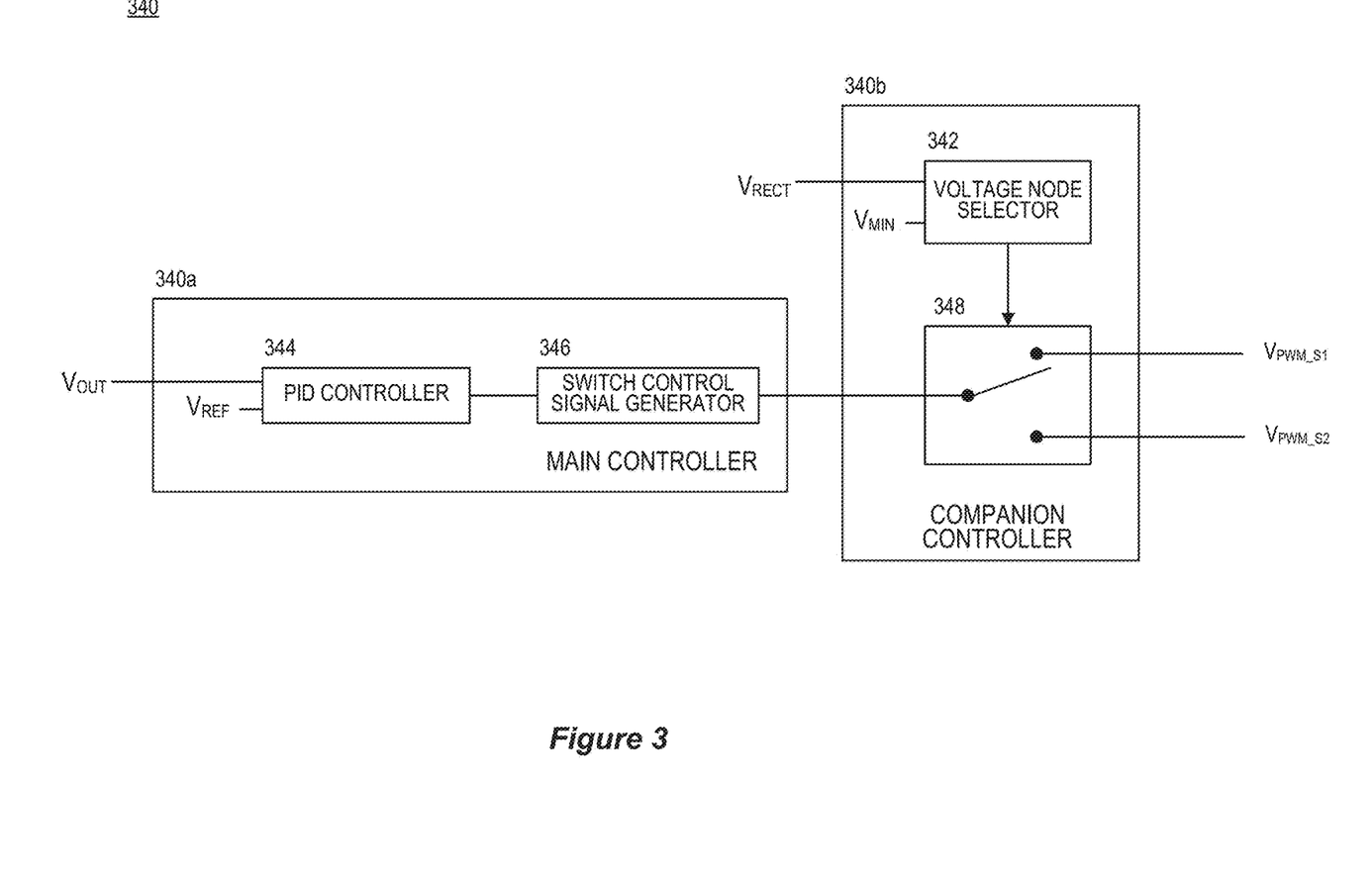
FIG. 3 illustrates a power converter controller that is an alternative to the controller included in the power converter of FIG. 1.

FIG. 3 illustrates an embodiment for an alternative controller 340 that could be used in the power converter 100 of FIG. 1. This alternative controller 340 is partitioned into a main controller 340a and a companion controller 340b. The alternative controller 340 controls a power converter in much the same manner as the controller 140 of FIG. 1, but with a modified partitioning that may be preferred in some applications. The main controller 340a includes a PID controller 344 and a switch control signal generator 346, which are configured to perform techniques similar to the corresponding circuits within the power converter 100 of FIG. 1. However, the main controller 340a only includes one switch control signal generator 346.

The companion controller 340b includes a voltage node selector 342 and a routing switch 348. The voltage node selector 342 functions in much the same capacity as the corresponding circuit illustrated in FIG. 1. However, rather than enabling one of two switch control signal generators, the voltage node selector 342 compares the measured voltage at the first rectified voltage $V_{RECT}$ and the minimum voltage $V_{MIN}$ to determine how to set the routing switch 348 to control the appropriate power switch $S_1$, $S_2$, so as to select the desired voltage node $V_{RECT}$, $V_{BULK}$ for supplying power to the transformer 120. The partitioning illustrated in FIG. 3 has the advantage that an existing (conventional) controller may be coupled to a companion controller 340b so as to support the selecting of a voltage node $V_{RECT}$, $V_{BULK}$, for powering a transformer, thereby avoiding the need to design an entirely new controller.

Power Converter with Switching on Positive Side of Primary-Side Windings

Figure 4:
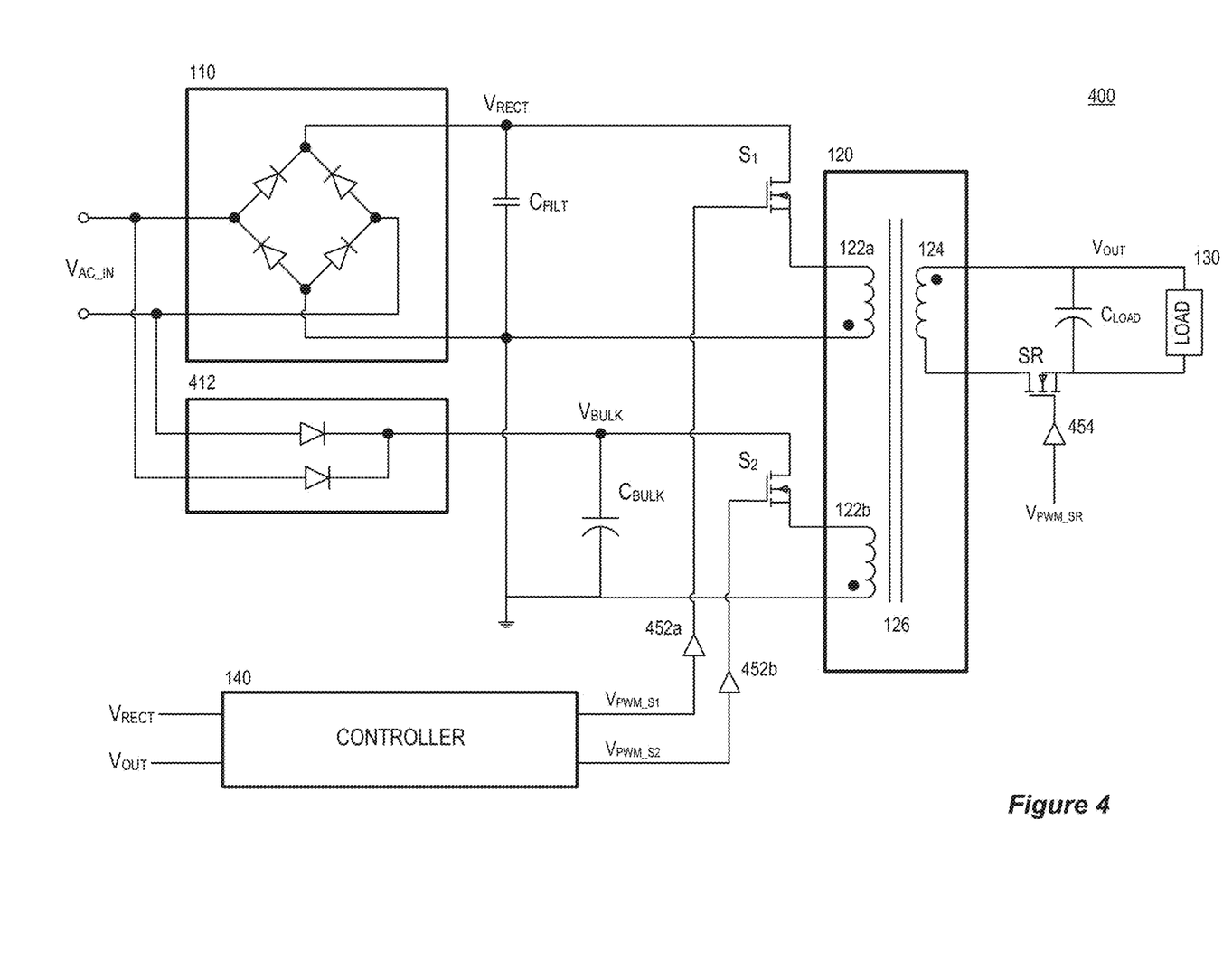
FIG. 4 illustrates a schematic diagram of a power converter in which power to the primary-side windings is switched on the positive side of these windings.

FIG. 4 illustrates a power converter 400 that is similar to that of FIG. 1. Only those aspects and components that differ from FIG. 1 will be described below. The power switches $S_1$, $S_2$ of the power converter 400 are connected such that power is switched on the positive voltage side of the primary-side windings 122a, 122b, rather than on the ground side of these windings. An advantage of such connections is that the "dotted" end of the primary-side windings 122a, 122b are kept relatively noise-free, since these terminals are tied to ground rather than floating when the power switches $S_1$, $S_2$ are open. Furthermore, the ground side of the primary-side windings 122a, 122b may be tied together within the transformer 120 and may share a common terminal of the transformer 120, thereby reducing the number of terminals (pins) required by the transformer 120. A disadvantage of such connections is that high-voltage drivers 452a, 452b are needed for driving the power switches $S_1$, $S_2$, as compared to the ground-referenced drivers 152a, 152b that could be used in the power converter 100 of FIG. 1.

The secondary side of the power converter 400 is altered to use a synchronous rectification switch SR on the ground side of the secondary-side winding 124, rather than a diode on the positive side of the secondary-side winding 124. The SR switch is controlled by a driver 454 and a control signal $V_{PWM\_SR}$. While not illustrated, the control signal $V_{PWM\_SR}$ is typically generated by the controller 140, based upon a voltage sensed at $V_{OUT}$. Because switch-based rectification and its associated control are well-known in the art, these techniques will not be explained further. Note that use of a synchronous rectification switch is typically more efficient than diode-based rectification techniques due to the lower conduction losses of power switches relative to diodes. This is particularly true for low voltages as are typical on the secondary side of a power converter.

Diodes 412 connected directly to the AC input $V_{AC\_IN}$ are used to supply power to the bulk capacitor $C_{BULK}$ and its associated voltage node $V_{BULK}$. This contrasts with the circuitry of FIG. 1, wherein a diode $D_1$ supplies power to the bulk capacitor $C_{BULK}$ from the first rectified voltage node $V_{RECT}$. The diodes 412 avoid a diode voltage drop, as compared with the use of the diode $D_1$ in FIG. 1, but require an additional diode in the power converter 400. Use of diodes such as the diodes 412 may be desired in other embodiments, including the other power converters illustrated herein. Note, also, that the diodes 412 could be replaced with power switches and active rectification, so as to further reduce conduction losses associated with the charging of the bulk capacitor $C_{BULK}$.

A filter capacitor $C_{FILT}$ is coupled across the rectified voltage node $V_{RECT}$ and ground. The filter capacitor $C_{FILT}$ is used to filter high-frequency noise from the rectified voltage node $V_{RECT}$. Note that the filter capacitor $C_{FILT}$ serves an entirely different purpose than the bulk capacitor $C_{BULK}$, which stores substantial amounts of energy, and that the capacitance of the capacitor $C_{FILT}$ is significantly smaller than that of the bulk capacitor $C_{BULK}$, e.g., by several orders of magnitude. Whereas the bulk capacitor $C_{BULK}$, stores energy from an AC source with a fairly low frequency, e.g., 50 Hz or 60 Hz, the filter capacitor $C_{FILT}$ removes unwanted noise caused by the fast switching, which is typically 100 KHz or higher, of the power switches $S_1$, $S_2$. The filter capacitor $C_{FILT}$ typically has a capacitance of 100 nF or less, and is not a significant portion of the power converter size. A similar filter capacitor may be desired in the other power converter circuits described herein.

Power Converters with a Single Primary-Side Winding

The power converters 100, 400 illustrated in FIG. 1 and FIG. 4 include separate primary-side windings 122a, 122b for coupling power from the two rectified voltage nodes $V_{RECT}$, $V_{BULK}$. This configuration enables a different number of turns in the primary-side windings 122a, 122b, which could beneficially compensate for a situation in which the voltage nodes $V_{RECT}$, $V_{BULK}$ have different voltage ranges. However, the operating voltage range for each of the nodes $V_{RECT}$, $V_{BULK}$ will typically be the same or, at least, similar. (For the example illustrated in FIG. 2, the operating voltage range for each of the nodes $V_{RECT}$, $V_{BULK}$ covers the range of approximately 86V to 125V, disregarding the voltage drop across $D_1$ which is typically minimal.) Hence, a common implementation of the transformer 120 would include the same number of turns for each of its primary-side windings 122a, 122b. In recognition of this, it can be seen that the transformer 120 could be modified to include a single primary-side winding, which would reduce the size and cost of the transformer 120.

Figure 5:
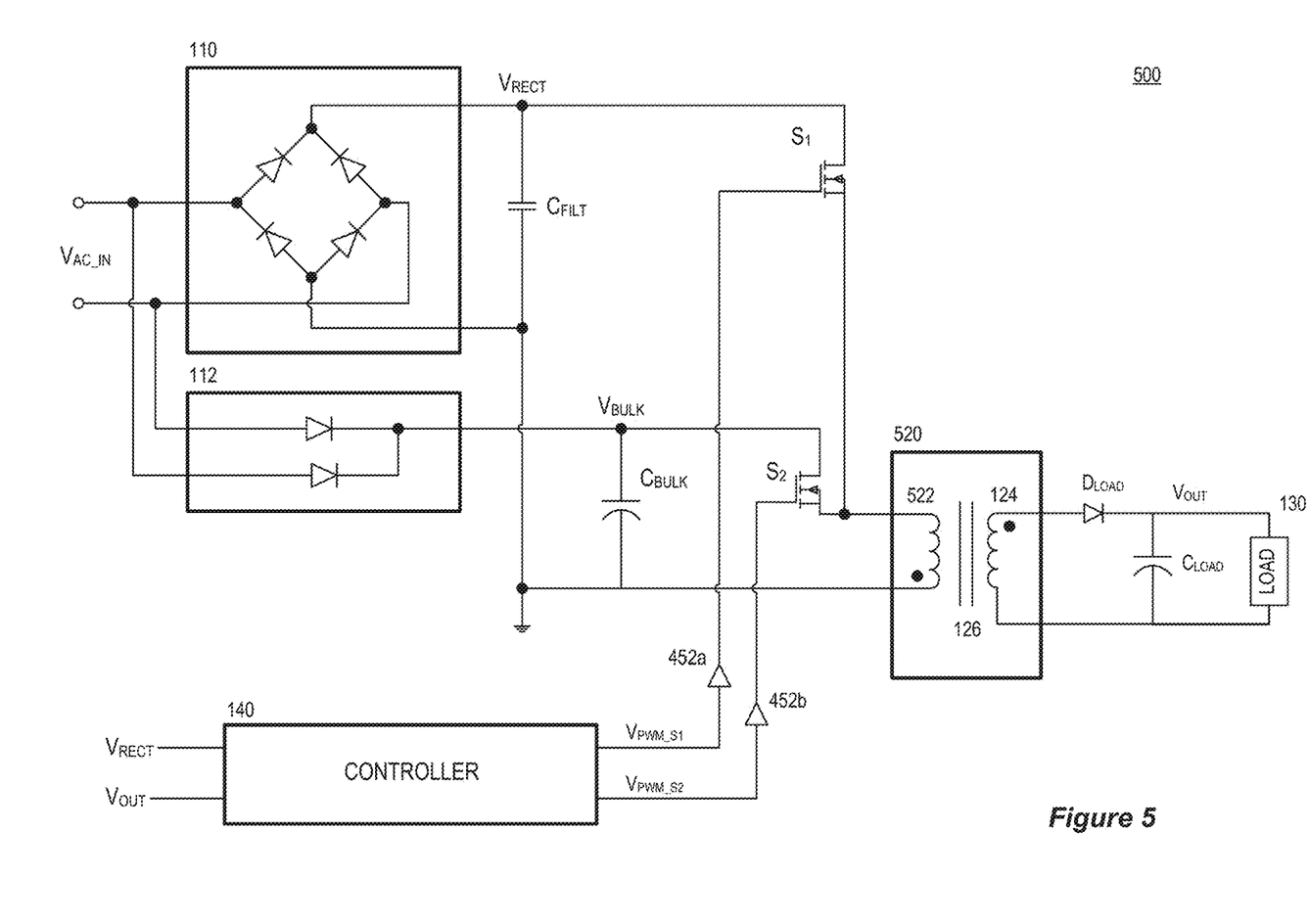
FIG. 5 illustrates a schematic diagram of a power converter having a single primary-side winding that is supplied power from two different voltage nodes.

FIG. 5 illustrates a power converter 500 that is similar to the power converters 100, 400 of FIGS. 1 and 4, but which includes a transformer 520 having a single primary-side winding 522. The power switches $S_1$, $S_2$ are controlled, via the PWM signals $V_{PWM\_S1}$, $V_{PWM\_S2}$, in much the same manner as described previously, to couple power from the first and second rectified voltage nodes $V_{RECT}$, $V_{BULK}$ to the transformer 520. However, the power switches $S_1$, $S_2$ couple power to the same primary-side winding 522, rather than to separate primary-side windings.

Figure 6:
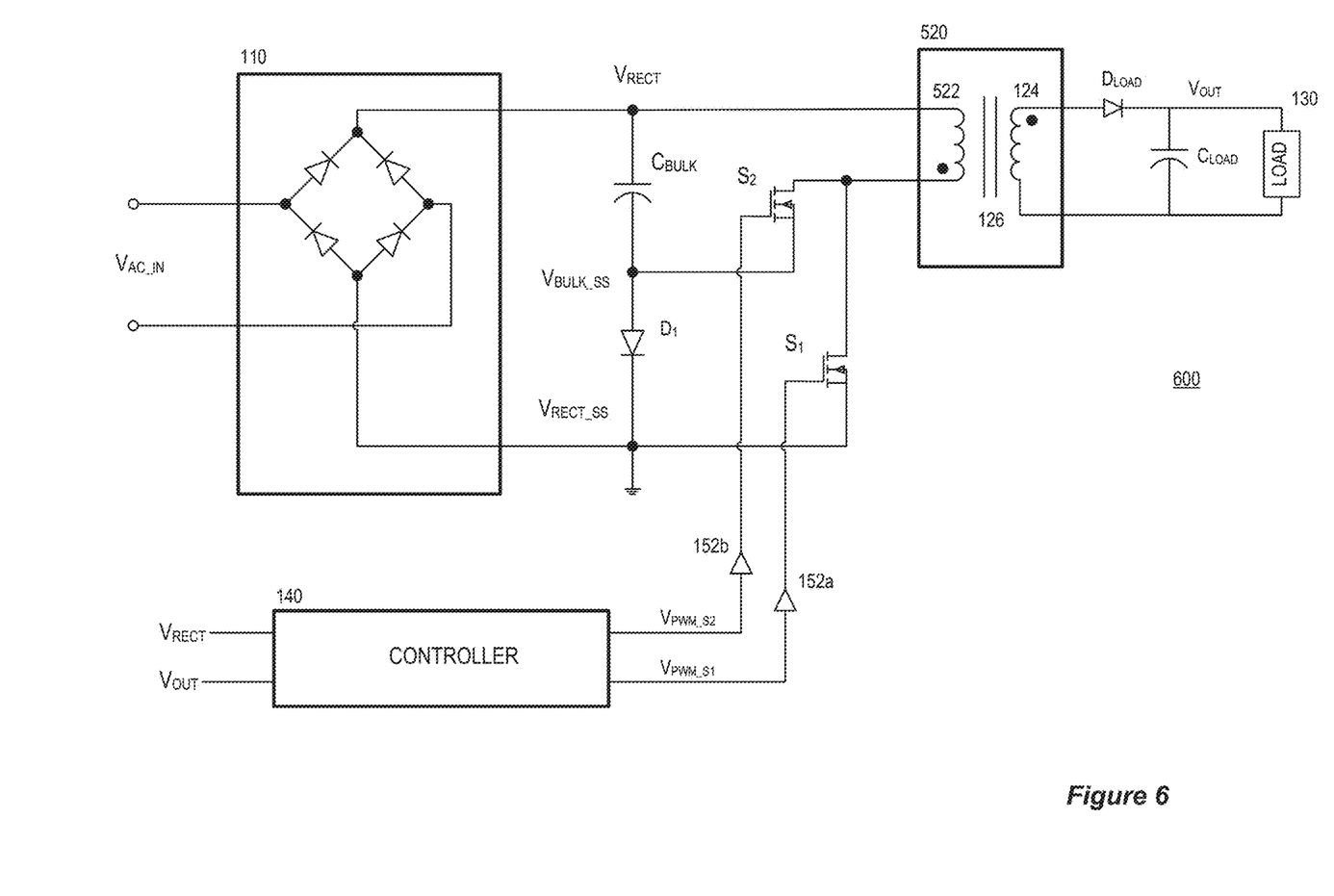
FIG. 6 illustrates a schematic diagram of a power converter having a single primary-side winding and where power is switched on the negative side of the winding.

FIG. 6 illustrates a power converter 600 that also has a single primary-side winding 522. This power converter 600 differs from that of FIG. 5 primarily in that power is switched on the ground side, and the selection between two voltage nodes is made between two voltage nodes on the negative side of the primary-side winding 522. The first power switch $S_1$ couples power to the primary-side winding 522 from the first rectified voltage node $V_{RECT}$ by switching the connection to a ground node $V_{RECT\_SS}$, that is coupled to the negative side of the rectifier 110. A bulk capacitor $C_{BULK}$ is connected between the first rectified voltage node $V_{RECT}$ and a diode $D_1$ at a voltage node $V_{BULK\_SS}$, with the diode $D_1$ further being connected to the ground node $V_{RECT\_SS}$. The second power switch $S_2$ couples power to the primary-side winding 522 from the first rectified voltage node $V_{RECT}$ by switching the connection to the second ground node $V_{BULK\_SS}$, which is tied to the bulk capacitor $C_{BULK}$. As previously explained, such a configuration has the advantage that the switch drivers 152a, 152b are ground-referenced and may be driven by a low-voltage control signal. However, this configuration has the disadvantage that the "dotted" terminal of the primary-side winding 522 is floating when the power switches $S_1$, $S_2$ are open, meaning that the transformer 520 will be more susceptible to noise, i.e., the output from the secondary winding 124 may be noisier than a configuration in which the primary-side winding 522 is always grounded.

Power Converters with Mixed Switch Control

The power converter 100 of FIG. 1 includes a potentially problematic behaviour related to a sudden increase in the voltage provided to the transformer 120. This can be seen in FIG. 2A, where the composite voltage provided to the first and second primary-side windings 122a, 122b jumps from $V_{MIN}$ to the maximum voltage of about 125V at times T1, T4, etc. Without any compensation for such a sudden change, the controller 140 may produce an undesirable voltage transient (increase) in the output voltage $V_{OUT}$ provided to the load 130. In response to such a transient, the PID controller 144 will eventually regulate the output voltage $V_{OUT}$ back to its desired value, e.g., $V_{REF}$, but may produce an output voltage $V_{OUT}$ outside of allowable limits for a brief interval.

In a further embodiment of a power converter, the controller 140 may address this problem by not suddenly changing between supplying power from the first rectified voltage node $V_{RECT}$ and the second rectified voltage node $V_{BULK}$, which is supplied from a bulk capacitor $C_{BULK}$. For example, at time T1 or slightly before this time, the controller 140 may intermix the switching of the first and second switches $S_1$, $S_2$ so that power is alternately drawn from the two different voltage nodes $V_{RECT}$, $V_{BULK}$. The controller 140 could generate a PWM pulse on $V_{PWM\_S1}$, followed by seven PWM pulses on $V_{PWM\_S2}$. The controller 140 might then generate another PWM pulse on $V_{PWM\_S1}$, followed by six PWM pulses on $V_{PWM\_S2}$. The controller 140 may continue such a gradual transition from using the first switch $S_1$ to using the second switch $S_2$ until all of the power supplied to the transformer 120 is coming from the second rectified voltage node $V_{BULK}$, and its associated bulk capacitor $C_{BULK}$. This will effectively filter the voltage input to the transformer 120, so as to avoid an instantaneous jump as illustrated at time T1 in FIG. 2A.

If the minimum voltage $V_{MIN}$ is a hard input limit of the transformer 120, then the gradual transition from using the first rectified voltage node $V_{RECT}$ to using the bulk capacitor node $V_{BULK}$ will need to begin before the rectified voltage falls to the minimum voltage $V_{MIN}$. The controller 140 will need to monitor the voltage at the first rectified voltage node $V_{RECT}$ and begin such a transition at a threshold $V_{MIN\_TRANS}$ that is higher than $V_{MIN}$. Alternatively, the transformer 120 may be able to withstand brief periods in which its input voltage falls below a desired minimum voltage $V_{MIN}$.

Figure 7:
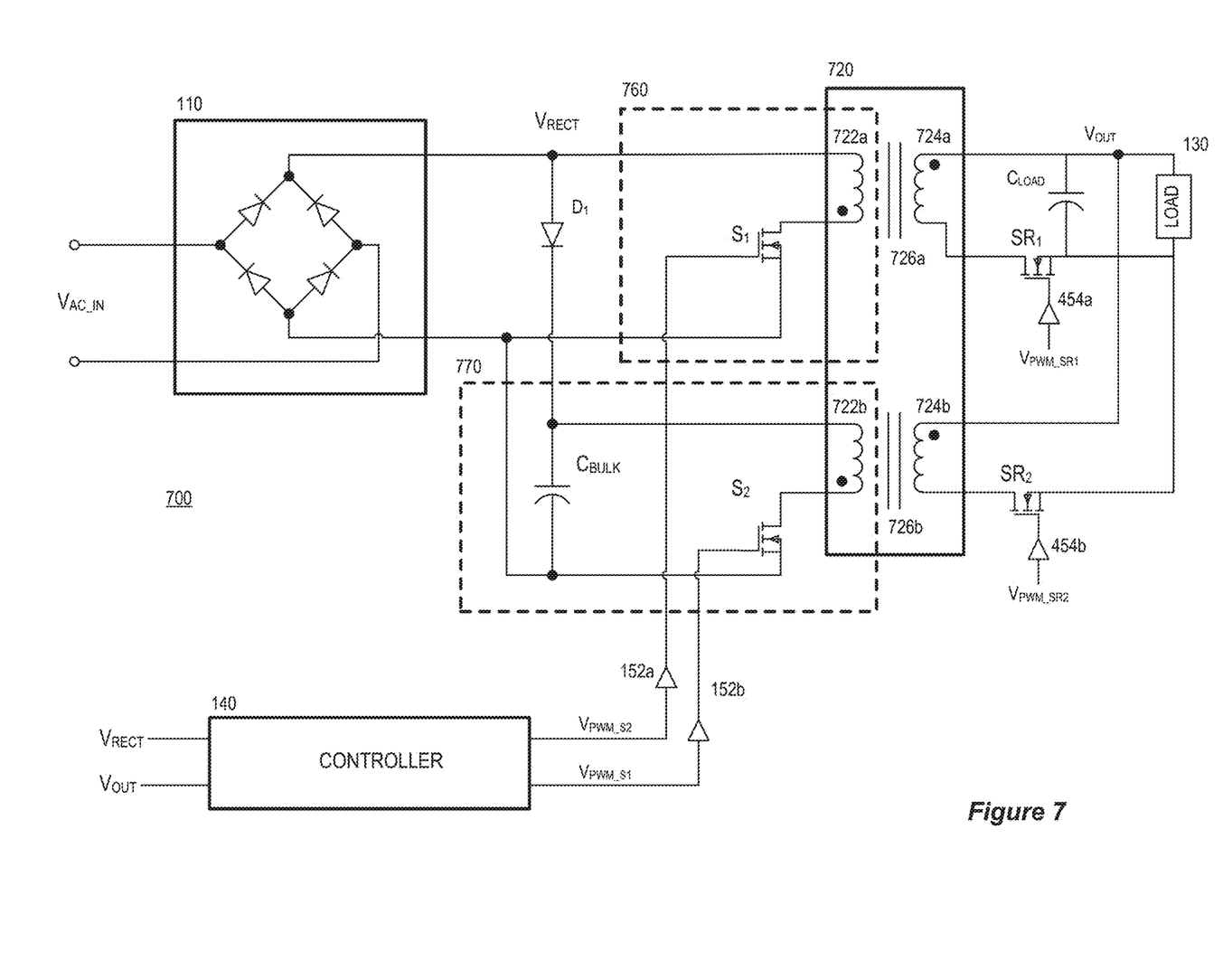
FIG. 7 illustrates a schematic diagram of a power converter having two primary-side windings and two secondary-side windings within its transformer.

FIG. 7 illustrates a power converter 700 that can mix power being supplied from both rectified voltage nodes $V_{RECT}$, $V_{BULK}$ without requiring that the controller 140 alternate pulses provided to the first and second switches $S_1$, $S_2$. This power converter 700 offers tremendous flexibility for the control of the first and second switches $S_1$, $S_2$.

The transformer 720 includes a first primary-side winding 722a, a first secondary-side winding 724a, and a core 726a, which couples power from the first rectified voltage node $V_{RECT}$ to the secondary side. The transformer 720 includes a second set of windings 722b, 724b and a core 726b, which are operable to couple power from the second rectified voltage node $V_{BULK}$ and its associated bulk capacitor $C_{BULK}$ to the secondary side. Synchronous rectification switches $SR_1$, $SR_2$ and their associated drivers 454a, 454b are used to rectify the voltage on the secondary side. Control signals $V_{PWM\_SR1}$, $V_{PWM\_SR2}$ are generated by a controller, as is known in the art. While not illustrated, these signals could be generated by the controller 140 and passed across an isolator to the secondary side of the power converter 700.

A power factor correction (PFC) primary-side circuit 760 may perform a type of power factor correction, and preferably supplies most of the power to the transformer 720. For example, the PFC primary-side circuit 760 may supply 20 W, when the power converter 700 is rated for 25 W. A ripple-cancelling circuit 770 may use the energy stored at the bulk capacitor $C_{BULK}$ to provide power when the voltage at the rectified voltage node $V_{RECT}$ of the PFC primary-side circuit 760 is too low to provide adequate power transfer.

Method for Controlling Power Converter with Separate Rectified Voltage Nodes

Figure 8:
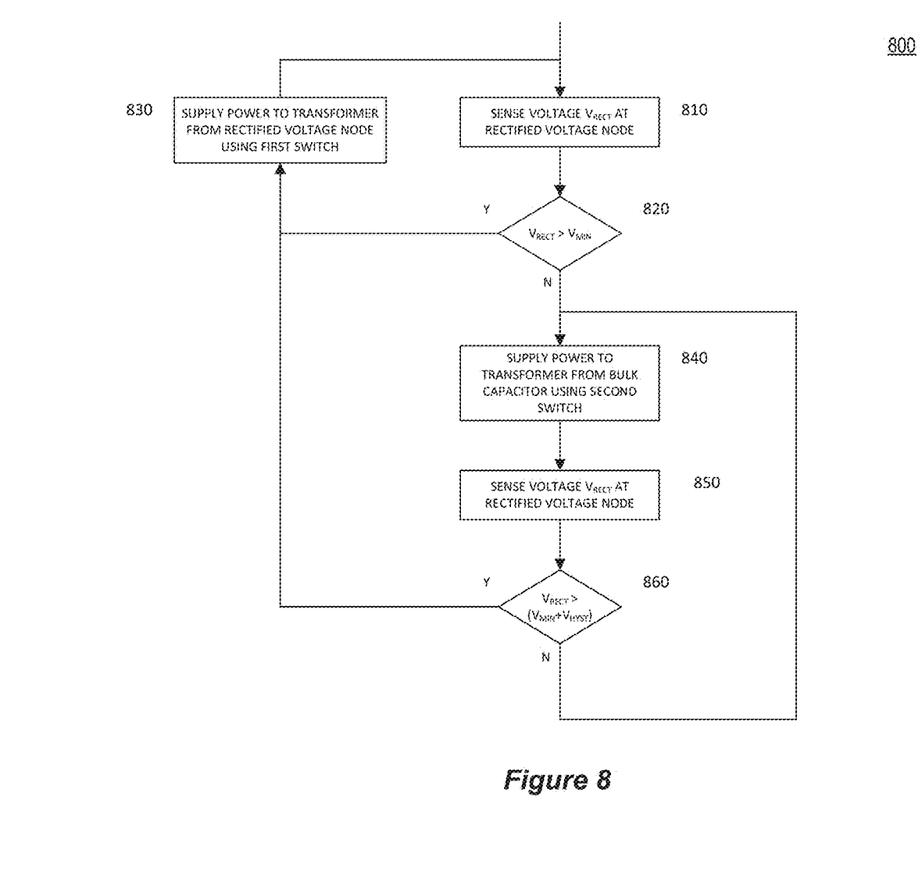
FIG. 8 illustrates a method, within a power converter, for switching power switches so as to supply power to primary-side windings(s) of a transformer from two different voltage nodes.

FIG. 8 illustrates a method 800 for supplying power to one or more primary-side windings of a power converter, such as the power converter 100 of FIG. 1. This method may be implemented, e.g., within a controller of the power converter, such as the controller 140 of FIG. 1. The techniques of this method 800 are similar to the techniques described above for the power converters of FIG. 1 and FIGS. 4-7, and may be implemented within such power converters.

In a first step 810, a voltage $V_{RECT}$ at a first rectified voltage node is sensed (measured). This may be done using an analog-to-digital converter (ADC) within a controller, as is known in the art. The sensed voltage $V_{RECT}$ is compared 820 with a minimum voltage $V_{MIN}$ that is allowed to be input to a transformer of the power converter. As long as the sensed voltage $V_{RECT}$ is greater than the voltage threshold $V_{MIN}$ allowed, power is supplied 830 to the transformer from the rectified voltage node by switching a first switch that couples power from the first rectified voltage node to the transformer.

Once the sensed voltage $V_{RECT}$ falls below the voltage threshold $V_{MIN}$, operation of the power converter is changed to supply 840 power to the transformer from a bulk capacitor, such as the capacitor $C_{BULK}$ of FIGS. 1 and 4-7, by switching a second switch. The voltage $V_{RECT}$ at the first rectified voltage node is measured 850 again and compared 860 against a second threshold voltage ($V_{MIN}+V_{HYST}$). The hysteresis value $V_{HYST}$ is optional, i.e., may be zero. When included, the hysteresis value $V_{HYST}$ prevents undesirable vacillations between operation using the first rectified voltage node and the bulk capacitor, wherein those vacillations are caused by noise on the measured voltage $V_{RECT}$. As long as the measured voltage $V_{RECT}$ remains below this second threshold voltage ($V_{MIN}+V_{HYST}$), power continues to be supplied 840 from the bulk capacitor $C_{BULK}$.

Once the sensed voltage $V_{RECT}$ rises above the second threshold voltage ($V_{MIN}+V_{HYST}$), operation of the power converter is changed to supply 830 power from the first rectified voltage node using the first switch, as described previously.

Such operation continues as long as the power converter is in use. Applying the method 800 of FIG. 8 to a power converter having a rectified voltage as illustrated in FIG. 2A, the transition to use the bulk capacitor and the second switch would occur at time T1, when it is detected that the sensed voltage has fallen to the minimum voltage $V_{MIN}$. The transition back to using the first rectified voltage node and the first switch would occur at time T2, when the sensed voltage has risen to the minimum voltage $V_{MIN}$ plus, optionally, a hysteresis voltage $V_{HYST}$. Such transitions should occur twice per each half-sinusoidally shaped interval of the sensed voltage at the rectified voltage node.

As used herein, the terms "having," "containing," "including," "comprising," and the like are open-ended terms that indicate the presence of stated elements or features, but do not preclude additional elements or features. The articles "a," "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein, Therefore, it is intended that this invention be limited only by the claims and the equivalents thereof.

What is claimed is:

1. A power converter, comprising:
   a rectifier configured to input alternating current (AC) power from an input power source and provide a rectified voltage at a rectified voltage node;
   a bulk capacitor that is supplied with power from the input power source;
   a transformer comprising one or more primary-side windings;
   a first switch configured to provide power to the one or more primary-side windings from the rectified voltage node;
   a second switch configured to provide power to the one or more primary-side windings from the bulk capacitor; and
   a controller configured to:
      sense the rectified voltage at the rectified voltage node,
      responsive to detecting that the sensed rectified voltage is above a threshold voltage, switch the first switch such that the first switch provides power to the one or more primary-side windings from the rectified voltage node, and
      responsive to detecting that the sensed rectified voltage is below the threshold voltage, switch the second switch such that the second switch provides power to the one or more primary-side windings from the bulk capacitor.

2. The power converter of claim 1, wherein the controller is further configured to:
   responsive to detecting that the sensed rectified voltage is below the threshold voltage, turn off the first switch so as to disconnect the rectified voltage node from the one or more primary-side windings.

3. The power converter of claim 1, wherein the controller is further configured to:
   responsive to detecting that the sensed rectified voltage is above the threshold voltage, turn off the second switch so that power is not provided from the bulk capacitor to the one or more primary-side windings.

4. The power converter of claim 1, further comprising:
   a diode or switch that couples the rectified voltage node to the bulk capacitor, so as to allow current to flow from the rectified voltage node to the bulk capacitor and to block current flow from the bulk capacitor to the rectified voltage node, and
   wherein the power supplied to the bulk capacitor from the input power source is supplied via the rectifier and the rectified voltage node.

5. The power converter of claim 1, further comprising:
   a second rectifier, comprised of one or more diodes or switches, that is coupled to the input power source and configured to supply power to the bulk capacitor.

6. The power converter of claim 1,
   wherein the one or more primary-side windings comprises a first primary-side winding and a second primary-side winding,
   wherein the first switch is configured to provide power from the rectified voltage node to the first primary-side winding, and
   wherein the second switch is configured to provide power from the bulk capacitor to the second primary-side winding.

7. The power converter of claim 6,
   wherein the first switch switchably couples the rectified power node to the first primary-side winding, and
   wherein the second switch switchably couples the bulk capacitor to the second primary-side winding.

8. The power converter of claim 6,
   wherein the transformer further comprises a first secondary winding magnetically coupled to the first primary winding,
   wherein the transformer further comprises a second secondary winding magnetically coupled to the second primary winding, and
   wherein the first secondary winding and the second secondary winding are coupled to the load of the power converter.

9. The power converter of claim 1,
   wherein the one or more primary-side windings comprises a first primary-side winding,
   wherein the first switch switchably couples the rectified voltage node to the first primary side-winding, and
   wherein the second switch switchably couples the bulk capacitor to the first primary side winding.

10. The power converter of claim 1,
    wherein the transformer comprises a secondary-side winding, and
    wherein the power converter further comprises a synchronous rectification switch coupled to the secondary-side winding and configured to provide rectified power to the load.

11. The power converter of claim 1,
    wherein the power converter has an output power rating in Watts, and wherein the bulk capacitor has a capacitance of 1.0 to 1.4µF per Watt of the output power rating.

12. The power converter of claim 1,
wherein the power converter has an output power rating of 25 Watts or greater, and
wherein the bulk capacitor has a capacitance rating of 33µF or less.

13. The power converter of claim 1,
wherein the first switch is a metal-oxide semiconductor field effect transistor (MOSFET).

14. A method of controlling a power converter that comprises a rectifier configured to input alternating current (AC) power from an input power source and provide a rectified voltage at a rectified voltage node, a bulk capacitor that is supplied with power from the input power source, a transformer comprising one or more primary-side windings, a first switch configured to provide power to the one or more primary-side windings from the rectified voltage node, and a second switch configured to provide power to the one or more primary-side windings from the bulk capacitor, the method comprising:
   sensing the rectified voltage at the rectified voltage node;
   responsive to detecting that the sensed rectified voltage is above a threshold voltage, switching the first switch such that the first switch provides power to the one or more primary-side windings from the rectified voltage node; and
   responsive to detecting that the sensed rectified voltage is below the threshold voltage, switching the second switch such that the second switch provides power to the one or more primary-side windings from the bulk capacitor.

15. The method of claim 14, further comprising:
   responsive to detecting that the sensed rectified voltage is below the threshold voltage, turning off the first switch so as to disconnect the rectified voltage node from the one or more primary-side windings.

16. The method of claim 14, further comprising:
   responsive to detecting that the sensed rectified voltage is above the threshold voltage, turning off the second switch so that power is not provided from the bulk capacitor to the one or more primary-side windings.

17. The method of claim 14, wherein switching the first switch comprises generating a first pulse-width-modulated (PWM) waveform to control the first switch, wherein switching the second switch comprises generating a second PWM waveform to control the second switch, the method further comprising:
   sensing an output voltage of the power converter;
   adjusting a duty cycle or frequency of the first PWM waveform, the second PWM waveform, or both, based upon the sensed output voltage;
   further adjusting the first PWM waveform based upon the sensed rectified voltage; and
   further adjusting the second PWM waveform based upon a sensed voltage of the bulk capacitor.

* * * * *